(12) United States Patent
Wo et al.

(10) Patent No.: US 7,208,554 B2
(45) Date of Patent: Apr. 24, 2007

(54) POLYOXYALKYLENE PHOSPHONATES AND IMPROVED PROCESS FOR THEIR SYNTHESIS

(75) Inventors: Shiming Wo, Monroe Township, NJ (US); John Marshall Baker, Charleston, SC (US)

(73) Assignee: Rhodia Inc., Cranbury, NJ (US)

( * ) Notice: Subject to any disclaimer, the term of this patent is extended or adjusted under 35 U.S.C. 154(b) by 0 days.

(21) Appl. No.: 11/099,011

(22) Filed: Apr. 5, 2005

(65) Prior Publication Data

US 2005/0227877 A1 Oct. 13, 2005

Related U.S. Application Data

(60) Provisional application No. 60/560,190, filed on Apr. 7, 2004.

(51) Int. Cl.
*C08L 71/02* (2006.01)
*C08G 65/32* (2006.01)

(52) U.S. Cl. .................................. 525/403; 528/345

(58) Field of Classification Search ............... None
See application file for complete search history.

(56) References Cited

U.S. PATENT DOCUMENTS

| | | | | |
|---|---|---|---|---|
| 2,436,141 A | | 2/1948 | Goebel .................... 260/461 |
| 2,837,480 A | | 6/1958 | Hotten et al. ............... 252/32.5 |
| 2,965,570 A | * | 12/1960 | Fierce et al. ............... 508/431 |
| 3,064,031 A | | 11/1962 | Zimmerer .................... 260/461 |
| 3,092,651 A | | 6/1963 | Friedman .................... 260/461 |
| 3,139,450 A | * | 6/1964 | Friedman .................... 558/165 |
| 3,265,681 A | * | 8/1966 | Friedman .................... 558/186 |
| 3,385,801 A | * | 5/1968 | Birum et al. ............... 521/107 |
| 3,483,279 A | * | 12/1969 | Davis et al. ............... 558/124 |
| 3,517,090 A | * | 6/1970 | Friedman .................... 558/186 |
| 3,536,738 A | * | 10/1970 | Koos et al. ................... 560/127 |
| 3,555,125 A | | 1/1971 | Curry ......................... 260/980 |
| 3,578,731 A | * | 5/1971 | Mange et al. ............... 558/165 |
| 3,669,610 A | * | 6/1972 | Friedman .................... 8/128.1 |
| 3,763,287 A | * | 10/1973 | Chiddix et al. ............. 558/179 |
| 3,778,375 A | * | 12/1973 | Braid et al. ................. 508/420 |
| 3,784,507 A | * | 1/1974 | Braunstein .................. 524/710 |
| 3,855,360 A | | 12/1974 | Shim .......................... 260/929 |
| 3,879,498 A | * | 4/1975 | Iliopous et al. ............. 558/182 |
| 4,021,333 A | | 5/1977 | Habiby et al. ............... 208/179 |
| 4,278,129 A | | 7/1981 | Walton ........................ 166/263 |
| 4,309,333 A | | 1/1982 | Silberberg ............... 260/42.14 |
| 4,311,652 A | * | 1/1982 | Abramson et al. ............ 558/88 |
| 4,633,005 A | * | 12/1986 | Nalewajek et al. .......... 558/125 |
| 5,183,830 A | | 2/1993 | Mohring et al. ............. 521/107 |
| 6,051,627 A | | 4/2000 | Thetford et al. ............. 523/160 |
| 6,100,359 A | | 8/2000 | Ghatan ......................... 528/51 |
| 6,638,998 B2 | | 10/2003 | Zhao et al. ................... 524/127 |
| 6,717,007 B1 | * | 4/2004 | Dubey et al. ................... 562/8 |

* cited by examiner

*Primary Examiner*—Randy Gulakowski
*Assistant Examiner*—John J. Figueroa

(57) ABSTRACT

A process for preparing polyoxyalkylene phosphonates in high yield and purity without extensive isolation procedures. The process also enables hydroxy terminated polyoxyalkylene phosphonates to be produced with their attendant high aqueous solubility and the availability of the reactive group to have the end functionality easily molecularly modified. Products produced by these processes have enhanced dispersion, coating, adhesion, and plasticizing characteristics as a result of the lack of any steric hinderance on these polyoxyalkylene phosphonates.

10 Claims, No Drawings

POLYOXYALKYLENE PHOSPHONATES AND IMPROVED PROCESS FOR THEIR SYNTHESIS

This patent application claims priority from U.S. provisional patent application Ser. No. 60/560,190 filed on Apr. 7, 2004.

FIELD OF THE INVENTION

The present invention generally relates to an improved process for the synthesis of polyoxyalkylene phosphonates in high yield and the enhanced surface treatment properties, for example, coating and dispersion properties that can be achieved by various uses of these compounds in formulations, especially aqueous formulations.

BACKGROUND OF THE INVENTION

Mono $C_1$–$C_4$ alkyl phosphoric acid esters have been used for many years as wetting agents, detergents and aqueous corrosion inhibitors; however the short chain alkyl group is only capable of delivering a very limited number of benefits. Furthermore, these short chain alkyl phosphate esters, albeit water soluble, tend to realize unacceptable foaming under certain conditions.

To obtain additional benefits from the alkyl moiety and minimize the foaming characteristics, the art extended the length of the alkyl chain to the range of from about $C_6$–$C_{30}$. This long chain alkyl moiety provided additional properties that enabled the oil soluble monoalkyl phosphate esters to be used in secondary oil well recovery systems; as asphalt additives; and as components in power transmission fluids.

However, the benefits realized by the alkyl moiety also limited the uses of these phosphate compounds because the hydrophobicity of the alkyl chain impaired the use of the compounds in aqueous formulations. As a result, the art explored a third approach which was to replace the mono alkyl long chain radical in the phosphate compounds with a polyoxyalkylene moiety.

Polyoxyalkylenes per se, such as homopolymers and copolymers of alkylene oxide (EO), propylene oxide (PO), and butylene oxide (BO) are relatively inexpensive and are a very useful class of polymers, i.e., they have a very broad applications spectrum. They function as plasticizers in the adhesives, ceramics, and paper industries; as lubricants in the synthetic lubricant, metal working, natural and synthetic rubber, and textile industries; as protective coatings in the electroplating, electropolishing, and plastics molding industries; and as foam control agents in water and wastewater treatment facilities.

Replacing the mono long chain alkyl group on the phosphoric acid with a polyoxyalkylene homopolymer or copolymer moiety was fairly successful in achieving water miscibility together with a reduction in foaming characteristics. These mono alkoxylated phosphate esters have been disclosed as being used as dispersants for organic and inorganic particles in aqueous compositions, for example, as compatibility surfactants to reduce clustering of pigments in latex paints. They have also been disclosed as being useful as thickening agents in aqueous hydraulic fluids; as corrosion inhibitors; and as scale inhibitors in aqueous coolant compositions.

However, although the polyoxyalkylene phosphate esters could theoretically provide many additional useful benefits, they suffer from some serious drawbacks vis-a-vis their commercial desirability. At the outset, mono alkyl and mono polyoxyalkylene phosphate esters, albeit highly desirable because of the substrate adhesion force realized by the phosphate moiety, are extremely difficult to prepare in high yields and purity. Current syntheses tend to produce significant quantities of the less desirable dialkyl phosphates, dipolyoxyalkylene phosphates, and impurities that require extensive and expensive purification and isolation procedures. For instance, conventional processes give a mixture of mono alkyl and dialkyl phosphate esters with a ratio of no higher than 90:10. Efforts to suppress the formation of the dialkyl esters tend to result in the production of a large amount of corrosive phosphoric acid in the product composition.

Furthermore, while the phosphate moiety will bind or anchor to many different substrate surfaces, it will do so only under fairly mild conditions. That is, the phosphates tend to be both thermally and hydrolytically unstable. At elevated temperatures, the phosphates are susceptible to hydrolysis under both basic and acidic conditions.

It has been recognized in the art that long chain alkyl phosphonates having the general structure of formula I:

(I)

wherein $R_1$ is independently H or $C_1$ to $C_4$ alkyl and $R_2$ is $C_6$ or higher alkyl, are much more stable than the phosphates, both thermally and hydrolytically, and they are also known to react or interact with surfaces of many different materials. They have a very strong affinity for metal, particularly aluminum, and inorganic salt particles. These phosphonates are used to prevent the staining of aluminum surfaces due to oxidation and they also provide a lubricity effect to the metal, i.e., coatings utilizing these long chain phosphonates on metal substrates are able to decrease contact wear during processing or use of the metal.

The long chain alkyl phosphonates are also used as coatings on inorganic fillers or metal pigments to improve their dispersions by lowering the energy required to disperse the filler or pigment, especially in polymeric substrates. Use of these dispersant alkyl phosphonates increases the amount of filler that can be incorporated into a master batch thereby improving the storage stability of the filler; the processing of the filler into the plastic matrix; and the physical properties of the filled polymer product.

The long chain alkyl phosphonates have also been used in organic environments as corrosion inhibitors, plasticizers, synthetic lubricants, flame retardant additives, and textile treatment agents. As a result of their high oil solubility, they are used in power transmission fluids, extreme pressure lubricant additives, and as high melting grease thickening agents.

In both the mono alkyl phosphate and phosphonate cases, the phosphate or phosphonate group serves as the anchor, i.e., provides the adhesive force to bind the compound to the substrate and the mono alkyl chain on the C—O—P or C—P bond, as the case may be, provides the benefits; whether it is a lubricity, or dispersion, or an anti-staining/anti-oxidative property. In the case of these long chain alkyl molecules, the achievement of these benefits can be attributed to the hydrophobization of the surface of the substrate by the group attached to the carbon atom of the C—O—P or C—P bond.

However, as with the phosphate compounds discussed above, one of the drawbacks of the alkyl phosphonates is that they have a very narrow range of applications due to the fact that the alkyl group is (i) only capable of delivering a very limited number of benefits; (ii) the $C_1$–$C_4$ alkyls tend to foam under certain conditions; and (iii) the long alkyl chain phosphonates are not water soluble which, of course, hinders their applications in aqueous formulations.

The very diversity of these various phosphate and phosphonate compounds is an indication that all are not equally useful. It is not unusual to find some of these compounds function quite well, for example, providing a dispersing or coating property in one environment and not at all in another environment. Thus, there is a continual need and a continuing search for new phosphorous containing compounds and compositions, such as the phosphonates, and methods for preparing same to satisfy many unmet needs.

Accordingly, it is an object of this invention to provide phosphonate compounds and compositions with a range of applicability and usefulness equal to or exceeding many of polyoxyalkylene homo- and co-polymers and having, in addition, enhanced substrate adhesion properties.

It is also an object of this invention to provide a straightforward, relatively inexpensive process for the production of these improved phosphonates in high yields and purity.

Additionally, it is a further object of this invention to provide a process for the synthesis of these phosphonate compounds wherein the moiety attached to the carbon atom on the C—P bond of the phosphonate is optionally end-capped with a hydroxyl group.

Other objects will be evident from the ensuing description and appended claims.

SUMMARY OF THE INVENTION

The present invention is directed to a process for the production of polyoxyalkylene phosphonates.

The process permits the high yield synthesis of these polyoxyalkylene phosphonates at relatively low temperatures with concomitant low impurities and/or undesirable by-products formation.

Furthermore, the syntheses can realize products wherein the polyoxyalkylene moiety is end-capped with a hydroxy group.

The present process requires reacting a polyalkylene glycol alkenyl ether, as hereinafter defined, with a phosphite, also hereinafter defined, in the presence of a radical initiator.

Products produced by this process have significantly enhanced lubricating, plasticizing, dispersing, and protective coating properties over similar phosphorous containing compounds in the prior art.

DETAILED DESCRIPTION OF THE INVENTION

The present invention relates to a process for forming compositions containing polyoxyalkylene phosphonates having the general structure of the formula II:

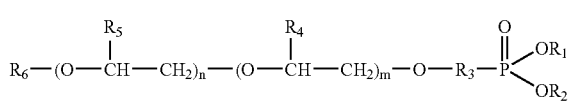

(II)

wherein $R_1$ and $R_2$ are independently H, $C_1$–$C_{20}$ alkyl, $C_3$–$C_{20}$ cycloalkyl, or $C_6$–$C_{20}$ aralkyl; $R_3$ is substituted or unsubstituted $C_2$–$C_{20}$ alkyl, $C_4$–$C_{20}$ cycloalkyl, or $C_8$–$C_{20}$ aralkyl; $R_4$ and $R_5$ are independently H or $C_1$–$C_2$ alkyl; $R_6$ is H, $C_1$–$C_{20}$ alkyl, $C_3$–$C_{20}$ cycloalkyl, or $C_6$–$C_{20}$ aralkyl; m and n are independently 0–200; and the moieties to which m and n are subscripted and refer to are either blocked, randomly spaced, or both along the chain between the $OR_3$ and $R_6$ groups; products produced by this process; and end use applications for aqueous formulations containing these compositions.

The process of this invention produces the phosphonates of formula II by reacting a polyalkylene glycol alkenyl ether of the general structure of formula III with a phosphite having the general structure of formula IV in the presence of a radical initiator according to the following reaction scheme:

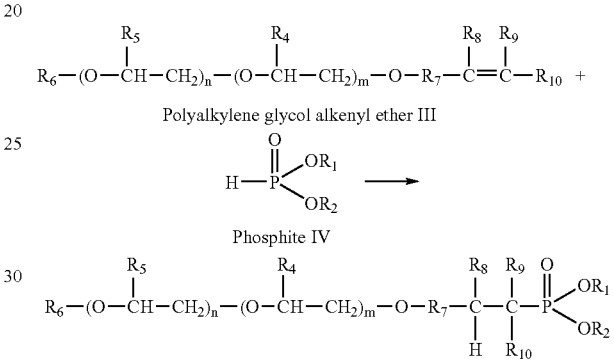

wherein $R_1$, $R_2$, $R_4$, $R_5$, $R_6$, m and n are as identified in formula II above and $R_7$, $R_8$, $R_9$, and $R_{10}$ are each independently H, $C_1$–$C_{20}$ alkyl, $C_3$–$C_{20}$ cycloalkyl, or $C_6$–$C_{20}$ aralkyl.

Preferred are when $R_1$ and $R_2$ are the same or different and are H, alkyl having from 1 to about 10 carbon atoms, cycloalkyl having from 3 to about 10 carbon atoms, or $C_6$–$C_{12}$ aralkyl carbon atoms. Illustrative of these preferred $R_1$ and $R_2$ substituents are alkyls, such as methyl, ethyl, propyl, isopropyl, n-butyl, sec-butyl, pentyl and its isomers, hexyl and its isomers, heptyl and its isomers, and the like; and cycloalkyls such as cyclobutyl, cyclopropyl, cyclohexyl, cyclopentyl, and the like.

The preferred $R_1$ and $R_2$ substituents may be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl) and the like.

Illustrative of the preferred $R_1$ and $R_2$ aralkyls are benzyl, phenylethyl, naphthylmethyl, naphthylethyl, and the like.

The preferred $R_3$ substituents are the $C_1$–$C_{10}$ alkyls, most preferably the methyl and ethyl moieties.

The preferred $R_6$ substituent is an alkyl having from 1 to about 10 carbon atoms, a cycloalkyl having from 3 to about 10 carbon atoms, or a $C_6$–$C_{12}$ aralkyl. Illustrative of these preferred $R_6$ substituents are alkyls, such as methyl, ethyl, propyl, isopropyl, n-butyl, sec-butyl, pentyl and its isomers, hexyl and its isomers, heptyl and its isomers, and the like; and cycloalkyls such as cyclobutyl, cyclopropyl, cyclohexyl, cyclopentyl, and the like.

Illustrative of the preferred $R_6$ aralkyls are benzyl, phenylethyl, naphthylmethyl, naphthylethyl, and the like.

The preferred $R_6$ substituent may be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl) and the like.

Illustrative of the preferred $R_6$ aralkyls are benzyl, phenylethyl, naphthylmethyl, naphthylethyl, and the like.

Preferably m and n are independently 0 to 100; most preferably 0 to 50.

Preferably the $R_7$, $R_8$, $R_9$, and $R_{10}$ substituents are the same or different and are H, alkyl having from 1 to about 10 carbon atoms, cycloalkyl having from 3 to about 10 carbon atoms, or aralkyl having from $C_6$–$C_{12}$ carbon atoms. Illustrative of these preferred substituents are alkyls, such as methyl, ethyl, propyl, isopropyl, n-butyl, sec-butyl, pentyl and its isomers, hexyl and its isomers, heptyl and its isomers, and the like; and cycloalkyls such as cyclobutyl, cyclopropyl, cyclohexyl, cyclopentyl, and the like.

Illustrative of the preferred $R_7$, $R_8$, $R_9$, and $R_{10}$ aralkyls are benzyl, phenylethyl, naphthylmethyl, naphthylethyl, and the like.

The preferred $R_7$, $R_8$, $R_9$, and $R_{10}$ substituents may be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl) and the like.

The polyalkylene glycol alkenyl ether starting reactants (III) suitable for preparing the compositions and compounds of this invention can be divided into two categories: one wherein the polyalkylene glycol has one end capped with an alkenyl group and the other end as a free hydroxyl group as depicted in the general formula (IIIa); and the second type wherein the polyalkylene glycol has one end capped with an alkenyl group and the other end capped with an alkyl, cycloalkyl, or aralkyl group as depicted in the general formula (IIIb).

$$H-(O-\underset{R_5}{\underset{|}{CH}}-CH_2)_n-(O-\underset{R_4}{\underset{|}{CH}}-CH_2)_m-O-R_7-\underset{R_8}{\underset{|}{C}}=\underset{R_9}{\underset{|}{C}}-R_{10}$$

Polyalkylene glycol alkenyl ether IIIa $$R_6-(O-\underset{R_5}{\underset{|}{CH}}-CH_2)_n-(O-\underset{R_4}{\underset{|}{CH}}-CH_2)_m-O-R_7-\underset{R_8}{\underset{|}{C}}=\underset{R_9}{\underset{|}{C}}-R_{10}$$

Polyalkylene glycol alkenyl ether IIIb wherein the R's, m, and n are as identified in formula III above.

In both cases, the polyalkylene oxide structure can consist of homopolymers of ethylene oxide, propylene oxide, or butylene oxide or copolymers of these monomers including random or block grouping of these ethylene oxide, propylene oxide, or butylene oxide moieties. Examples of the polyalkylene glycol alkenyl ether reactants include:

polyethylene glycol allyl ether (MW 498);
polyethylene glycol allyl ether (20 mols EO, 5 mols PO);
polyethylene glycol allyl methyl ether (MW 250);
polyethylene glycol allyl methyl ether (MW 350);
polyethylene glycol allyl methyl ether (MW 500);
polyethylene glycol allyl methyl ether (MW 1100);
polyethylene glycol allyl methyl ether (20 mols EO, 20 mols PO);
polyethylene glycol allyl butyl ether (25 mols EO, 8 mols PO);
polyethylene glycol vinyl ether (MW 440); and
polyethylene glycol vinyl methyl ether (MW 456).

Examples of the Phosphite (IV) include phosphorous acid, monoalkyl or monoaryl hydrogen phosphite such as monomethyl hydrogen phosphite, monoethyl hydrogen phosphite, monophenyl hydrogen phosphite, and dialkyl hydrogen phosphite such as dimethyl hydrogen phosphite, diethyl hydrogen phosphite, diisopropyl hydrogen phosphite, dibutyl hydrogen phosphite, and diphenyl hydrogen phosphite, and mixed esters such as methyl ethyl hydrogen phosphite. Dialkyl hydrogen phosphites are preferred due to their high reactivity compared to the other phosphites. Preferable dialkyl hydrogen phosphites include dimethyl hydrogen phosphite and diethyl hydrogen phosphite.

The reaction is preferably carried out in the presence of a radical initiator. Typical initiators are those well known in the art such as di-tbutyl peroxide, dibenzoyl peroxide, 2,2'-azobisisobutyronitrile (AIBN), and sodium persulfate.

The reaction can be carried out in the presence of a solvent such as water, a typical organic solvent, or neat.

The temperature employed in the process of this invention can be varied widely depending on factors known to those skilled in the art. Reaction generally will be carried out at a temperature greater than 60° C. Reaction temperatures from about 60° C. to about 160° C. are preferred, most preferably from about 80° C. to about 140° C.

The reaction may be carried out at atmospheric pressure or above atmospheric pressure in a sealed vessel. For convenience, and to ease removal of certain by-products during the reaction if so desired, the reaction is preferably carried out above atmospheric pressure.

The process of this invention is conducted for a period of time sufficient to produce the desired compound in adequate yield. Reaction times are influenced to a significant degree by the choice of radical initiator; the reaction temperature; the concentration and choice of reactants; and other factors known to those skilled in the art. In general, reaction times can vary from a few hours to several days or longer.

The process of this invention can be conducted in a batch, semi-continuous or continuous fashion. The reaction can be conducted in a single reaction zone or in a plurality of reaction zones, in series or in parallel; or it may be conducted intermittently or continuously in an elongated tubular zone or series of such zones. The materials of construction employed should be inert to the reactants during the reaction and the equipment should be fabricated such that it is able to withstand the reaction temperatures and pressures.

In use, the product phosphonate compositions of this invention preferably further comprise a liquid, especially one in which the phosphonate is at least partially soluble and more especially is either water or an organic liquid which is miscible with water including mixtures thereof. Examples of suitable liquids include alcohols such as $C_1$–$C_{10}$ aliphatic alcohols, glycols such as $C_2$–$C_6$ alkylene glycols, alcohol ethers such as methoxy, ethoxy, propoxy, and butoxyethanol and methoxy, ethoxy and propoxypropanol; and glycol ethers such as diethylene glycol and propylene glycol. Generally, the liquid is selected to meet the requirements of the end-use to which the composition is put; especially compatibility with any medium with which it is to be diluted.

In addition to providing coatings on large solid surfaces, compositions of this invention can be used as dispersing agents or as coatings on essentially any particulate solid that one wishes to stabilize in a finely divided state, preferably in a liquid medium. Examples of suitable solids are pigments and fillers for inks, paints and other surface coatings; magnetic metals or alloys and magnetic oxides, for use in the production of magnetic tapes, discs and memory devices; dirt and soil particles; biocides; agrochemicals and pharmaceuticals. The compositions, whether dry or in the form of dispersions in a liquid medium, may contain other ingredients such as resins, binders, fluidizing agents, anti-sedimentation agents, plasticizers, humectants, coalescents, co-solvents, thickeners, and preservatives. These ingredients may be soluble in, partially soluble in, insoluble in, or dispersed in the liquid medium.

If the solid particle is a pigment, it may be an organic pigment but preferably is an inorganic pigment, a metallic pigment, or a metal salt of an organic dyestuff.

Examples of organic pigments are those from the azo, diazo, thioindigo, indanthrone, anthanthrone, anthraquinone and the phthalocyanine series.

Examples of inorganic pigments are titanium dioxide, zinc oxide, Prussian Blue, cadmium sulphide, iron oxides, mica, and the chrome pigments. It is to be understood that the term inorganic pigment also includes carbon black, especially the chemically modified or coated versions of carbon black used in the printing and paint industries.

Examples of metallic pigments are aluminum flake, copper powder, and copper flake.

Examples of metal salts of organic dyestuffs are the azo metal salt pigments such as Cl Pigment Red 48, Cl Pigment Yellow 61, and Cl Pigment Yellow 191.

Examples of fillers are calcium carbonate, hydrated alumina, talc, quartz, silica (precipitated, pyrogenic, and synthetic), metal silicates, barium and calcium sulphate, china clay, antimony oxide, powdered slate, wollastonite and chopped glass fiber.

The compositions of this invention can be applied to solid particulate matter by any method known to the art. Thus, it may be applied by mixing together phosphonate composition of this invention and an unfinished particulate solid in the presence of a liquid medium and grinding or milling the mixture to obtain the desired final particle size. If the coated particulate material is required in dry form, the liquid medium is preferably volatile so that it may readily be removed from the coated particulate solid matter by simple separation means such as evaporation.

When the starting alkenyl ether in the syntheses of this invention is type IIIa, i.e., the polyoxyalkylene moiety is hydroxy terminated, it may be necessary to protect the hydroxyl moiety to prevent the undesired esterification or transesterification reaction between the hydroxyl group and the phosphite (IV). Protective compounds for the hydroxyl group, which are subsequently easily removed, are well known in the art. One method that is effective is to use acetic anhydride as the protective compound as outlined in the schematic below.

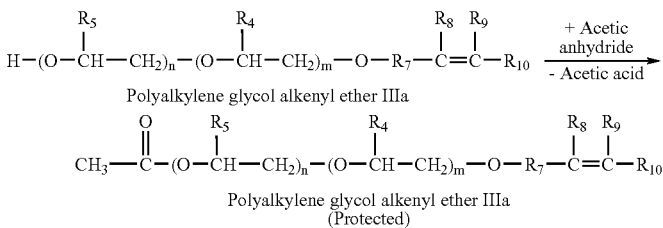

With the process of the instant invention, one is able to not only realize significantly higher yields of the polyalkoxylated phosphonate in the final product composition than that realized by other approaches to synthesizing the product, but also, serendipitously, the instant process is able to achieve in a simple reaction scheme, hydroxyl end capping of the polyoxyalkylene chain with all of the attendant advantages associated with the presence of such an end group, such as high aqueous solubility and the availability of a reactive group for further molecular modification if so desired.

The high concentration of the polyalkoxylated phosphonate with its lack of steric hinderance on the phosphonate moiety, realizes a final product composition with extraordinarily enhanced adhesive properties to myriad substrates. When one attempts to prepare the products of the instant invention by a Michaels-Arbuzov reaction of trialkyl phosphite with polyoxyalkylene containing alkyl halides, for example, the yields are not only significantly lower because of the formation of undesired phosphonate byproducts, but a significant amount of undesirable, and extremely difficult to remove unidentifiable impurities result. In addition, the higher temperatures utilized, by necessity, in the Arbuzov reaction process make it extremely difficult, if not impossible to prepare the hydroxyl terminated products of this invention for the hydroxyl group at those temperatures actively reacts with, i.e., attack any available phosphite linkage.

By "efficacious amount" is meant an amount sufficient to realize a noticeable increase in the property desired.

The invention will now be described with reference to a number of specific examples that are to be regarded solely as illustrative of the methods and compositions of this invention and not as restrictive of the scope thereof.

EXAMPLE I

To synthesize a composition of this invention containing a high yield of mono polyethylene glycol (EO) phosphonopropyl ether, two two-necked 500 mL round bottomed flasks are each equipped with Snyder distilling columns and a, distilling head. In the first apparatus, 1.0 mole of polyethylene glycol allyl ether (MW 498) and then 1.05 moles of acetic anhydride is added to the flask. The mixture is heated to 110° C. and is held at that temperature for 3 hours. During this time, the acetic acid by-product is allowed to distill off. At the end of the reaction, the excess acetic anhydride is removed under vacuum.

The resulting acylated polyethylene glycol allyl ether (1 mole) is mixed with 0.1 moles of the radical initiator di-tbutyl peroxide and the mixture added to the flask of the second apparatus which contains 1.1 moles of dimethyl hydrogen phosphite. The reaction mixture is heated to from about 130° C. to about 135° C. for 5.5 hours.

At the conclusion of the reaction, the reaction mixture is aged for an additional hour at which time the excess dimethyl hydrogen phosphite is removed under vacuum.

Water is added and the phosphonate is allowed to hydrolyze at from about 135° C. to about 150° C. for 20 hours. During this time, the volume ratio of organic mixture to water is kept at 1:1 and the by-products methanol and acetic acid are continuously removed by distillation.

The resulting reaction product composition yields essentially pure of polyethylene glycol (10EO) phosphonopropyl ether which is completely soluble in water.

A schematic of the above reaction steps is as follows:

exposure. Thus, this Example illustrates the superior protective coating performance that can be realized with the polyalkoxylated phosphonates of the instant invention as compared to similar polyalkoxylated phosphates of the prior art.

The high concentration of the polyoxyalkylene phosphonate in the product compositions realized by the process of this invention together with the adhesion property enhancement that is achieved by the absence of any steric hinderance on the phosphonate entity by the mono polyoxyalkylene moiety, significantly increase, not only the above illustrated coating characteristics of these products but also the ability of these product compositions to effectively adhere to and disperse particulate matter, especially inorganic and/or metallic particles.

It can readily be seen that one of the key advantages of the product compositions produced by the process of this invention is that, not only are hydroxyl terminated polyoxyalkylene phosphonates able to be produced, but that there is also a minimum formation of undesirable byproducts and impurities that are not able to be removed from the desired polyoxyalkylene phosphonate products very effectively or safely by conventional purification methods such as distil-

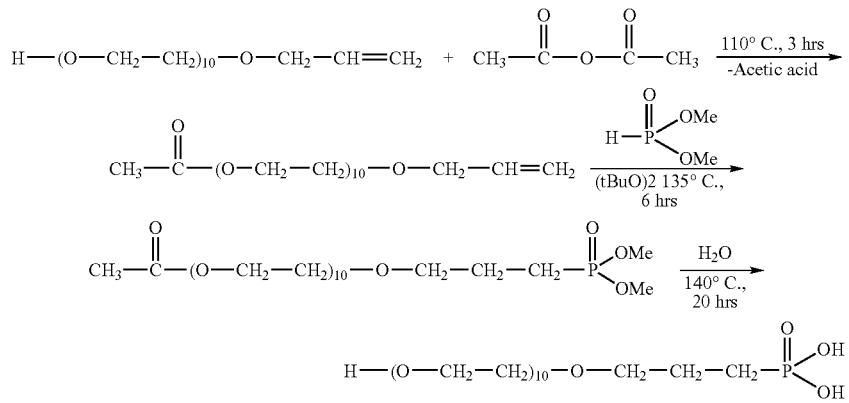

EXAMPLE II

A number of freshly milled aluminum coupons are divided into three lots. Lot number one is coated with the polyethylene glycol (10 EO) phosphonopropyl ether product composition of Example I and allowed to dry at room temperature for 24 hours. Lot number two is coated with a composition comprising a methyl end capped polyethylene glycol (10EO) phosphate prepared according to procedures similar to that set forth in U.S. Pat. Nos. 3,044,056 and 3,004,057. This second coated lot is also allowed to dry at room temperature for 24 hours. Lot number three is untreated and considered the "Control" lot.

All three lots are subsequently submerged in a 2% sodium hydroxide solution which is heated to 95° C. for five hours.

The coupons are removed from the basic solution and rinsed with cold water. The surface of the untreated "Control" coupons and the coupons that are coated with the polyethylene glycol phosphate are significantly darkened whereas the coloration of the surfaces that are coated with the mono polyethylene glycol (10 EO) phosphonopropyl ether product composition of Example I and the instant invention is essentially the same as the coloration that existed on the coupons prior to the sodium hydroxide lation, washing or wiped film evaporation. In fact, the synthesis method of the present invention is so efficient that the desired polyoxyalkylene phosphonate product can be obtained with a purity exceeding 85% without any purification.

Although this invention has been described in detail with particular reference to preferred embodiments thereof, it will be understood that variations and modifications can be effected within the spirit and scope of this invention as described hereinabove and as defined in the appended claims.

The invention claimed is:

1. A process for producing polyoxyalkylene phosphonates of the formula:

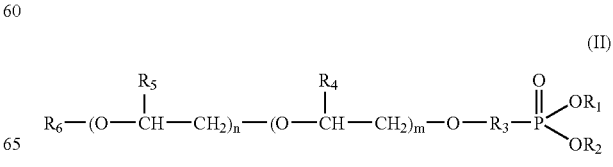

wherein $R_1$ and $R_2$ are independently H, $C_1$–$C_{20}$ alkyl, $C_3$–$C_{20}$ cycloalkyl, or $C_6$–$C_{20}$ aralkyl;

$R_3$ is substituted or unsubstituted $C_2$–$C_{20}$ alkyl, $C_4$–$C_{20}$ cycloalkyl, or $C_8$–$C_{20}$ aralkyl;

$R_4$ and $R_5$ are independently H or $C_1$–$C_2$ alkyl;

$R_6$ is H, $C_1$–$C_{20}$ alkyl, $C_3$–$C_{20}$ cycloalkyl, or $C_6$–$C_{20}$ aralkyl;

m and n are independently 1–200, and the moieties to which m and n are subscripted and refer to are either blocked, or randomly spaced, along the chain between the $OR_3$ and $R_6$ groups;

comprising the steps of reacting a polyalkylene glycol alkenyl ether of the formula:

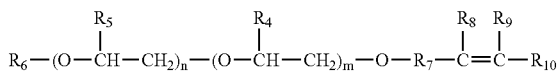

wherein $R_4$, $R_5$, $R_6$, m and n are as identified in the phosphonate formula above and $R_7$, $R_8$, $R_9$, and $R_{10}$ are each independently H, $C_1$–$C_{20}$ alkyl, $C_3$–$C_{20}$ cycloalkyl, or $C_6$–$C_{20}$ aralkyl;

with a phosphite of the formula:

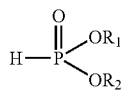

wherein $R_1$, and $R_2$ are as identified in the phosphonate formula above;

in the presence of a radical initiator.

2. The process of claim 1 wherein $R_1$ and $R_2$ are independently H or $C_1$–$C_4$ alkyl;

$R_3$ is ethyl or propyl;

$R_4$ is H or methyl;

m is 1–50;

n is 0;

$R_6$ is H, $C_1$–$C_{10}$ alkyl, $C_3$–$C_{10}$ cycloalkyl, or $C_6$–$C_{12}$ aralkyl;

$R_7$ is H or methyl; and $R_8$, $R_9$, and $R_{10}$ are H.

3. The process of claim 2 wherein $R_6$ is H or $C_1$–$C_{10}$ alkyl.

4. The process of claim 1 wherein the radical initiator is selected from the group consisting of di-tbutyl peroxide, dibenzoyl peroxide, 2,2'-azobisisobutyronitrile, and sodium persulfate.

5. The process of claim 1 comprising the additional step of isolating the polyoxyalkylene phosphonate.

6. A process for producing hydroxy terminated polyoxyalkylene phosphonates of the formula:

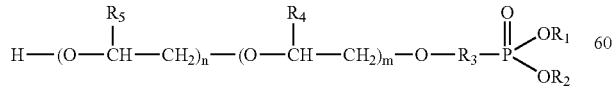

wherein $R_1$ and $R_2$ are independently H, $C_1$–$C_{20}$ alkyl, $C_3$–$C_{20}$ cycloalkyl, or $C_6$–$C_{20}$ aralkyl;

$R_3$ is substituted or unsubstituted $C_2$–$C_{20}$ alkyl, $C_4$–$C_{20}$ cycloalkyl, or $C_8$–$C_{20}$ aralkyl;

$R_4$ and $R_5$ are independently H or $C_1$–$C_2$ alkyl;

m and n are independently 1–200, and the moieties to which m and n are subscripted and refer to are either blocked, or randomly spaced, along the polyoxyalkylene chain;

comprising the steps of reacting a polyalkylene glycol alkenyl ether of the formula:

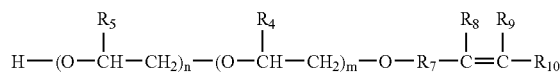

wherein $R_4$, $R_5$, $R_6$, m and n are as identified in the phosphonate formula above and $R_7$, $R_8$, $R_9$, and $R_{10}$ are each independently H, $C_1$–$C_{20}$ alkyl, $C_3$–$C_{20}$ cycloalkyl, or $C_6$–$C_{20}$ aralkyl;

with a protective compound which can effectively protect the hydroxyl moiety of the polyalkylene glycol alkenyl ether to form a protected polyalkylene glycol alkenyl ether;

subsequently reacting the protected polyalkylene glycol alkenyl ether with a phosphite of the formula:

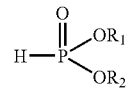

wherein $R_1$, and $R_2$ are as identified in the phosphonate formula above;

in the presence of a radical initiator; and hydrolyzing the product of the protected ether and phosphite reaction with water to form a composition containing the hydroxy terminated polyoxyalkylene phosphonate.

7. A process for producing hydroxy terminated polyoxyalkylene phosphonates of the formula:

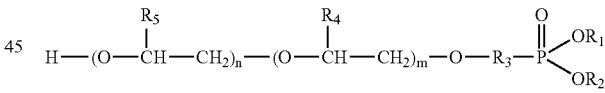

wherein $R_1$ and $R_2$ are independently H, $C_1$–$C_{20}$ alkyl, $C_3$–$C_{20}$ cycloalkyl, or $C_6$–$C_{20}$ aralkyl;

$R_3$ is substituted or unsubstituted $C_2$–$C_{20}$ alkyl, $C_4$–$C_{20}$ cycloalkyl, or $C_8$–$C_{20}$ aralkyl;

$R_4$ and $R_5$ are independently H or $C_1$–$C_2$ alkyl;

m and n are independently 1–200, and the moieties to which m and n are subscripted and refer to are either blocked, or randomly spaced, along the polyoxyalkylene chain;

comprising the steps of reacting a polyalkylene glycol alkenyl ether of the formula:

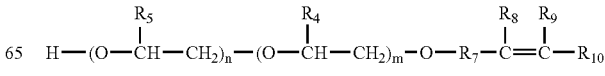

wherein $R_4$, $R_5$, $R_6$, m and n are as identified in the phosphonate formula above and $R_7$, $R_8$, $R_9$, and $R_{10}$ are each independently H, $C_1$–$C_{20}$ alkyl, $C_3$–$C_{20}$ cycloalkyl, or $C_6$–$C_{20}$ aralkyl;

with acetic anhydride to form an acylated polyalkylene glycol alkenyl ether of the formula:

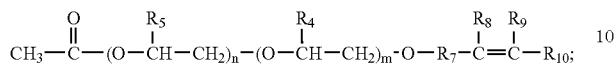

subsequently reacting the protected polyalkylene glycol alkenyl ether with a phosphite of the formula:

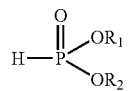

wherein $R_1$, and $R_2$ are as identified in the phosphonate formula above;

in the presence of a radical initiator; and hydrolyzing the product of the acylated ether and phosphite reaction with water to form a composition containing the hydroxy terminated polyoxyalkylene phosphonate.

8. The process of claim 6 wherein $R_1$ and $R_2$ are independently H or $C_1$–$C_4$ alkyl;

$R_3$ is ethyl or propyl;

$R_4$ is H or methyl;

m is 1–50;

n is 0;

$R_7$ is H or methyl; and $R_8$, $R_9$, and $R_{10}$ are H.

9. The process of claim 6 wherein the radical initiator is selected from the group consisting of di-tbutyl peroxide, dibenzoyl peroxide, 2,2'-azobisisobutyronitrile, and sodium persulfate.

10. The process of claim 6 comprising the additional step of isolating the hydroxy terminated polyoxyalkylene phosphonate.

* * * * *